United States Patent [19]

Markwardt

[11] Patent Number: 5,352,150
[45] Date of Patent: Oct. 4, 1994

[54] FEEDING DEVICE INSTALLED IN A LOADING BIN, FOR SPECIAL USE IN A SAUSAGE FILLING MACHINE

[76] Inventor: Klaus Markwardt, Hofestrabe 3b, 3014 Laatzen, Fed. Rep. of Germany

[21] Appl. No.: 874,182

[22] Filed: Apr. 24, 1992

[30] Foreign Application Priority Data

Apr. 27, 1991 [DE] Fed. Rep. of Germany ....... 4113807

[51] Int. Cl.5 .............................................. A22C 11/02
[52] U.S. Cl. ......................................... 452/30; 452/44
[58] Field of Search ................... 452/30, 35, 44, 43; 198/550.01, 657; 209/910, 913, 923

[56] References Cited

U.S. PATENT DOCUMENTS 2,889,574  6/1959  Thielen et al. ...................... 452/43

FOREIGN PATENT DOCUMENTS

| 0144110 | 6/1985 | European Pat. Off. |
| 1839007 | 4/1961 | Fed. Rep. of Germany. |
| 1839808 | 8/1961 | Fed. Rep. of Germany. |
| 1132464 | 6/1962 | Fed. Rep. of Germany ........ 452/44 |
| 1136605 | 9/1962 | Fed. Rep. of Germany ........ 452/44 |
| 1162714 | 2/1964 | Fed. Rep. of Germany. |
| 1775309 | 4/1972 | Fed. Rep. of Germany. |
| 2330922 | 2/1974 | Fed. Rep. of Germany. |
| 8810200 | 11/1988 | Fed. Rep. of Germany. |
| 9105198 | 6/1991 | Fed. Rep. of Germany. |
| 1422912 | 5/1966 | France. |
| 1571342 | 7/1980 | United Kingdom. |
| 2202005 | 9/1988 | United Kingdom. |

OTHER PUBLICATIONS

Deutsches Patentamt (German Search Report) (Citing references aa, ab and ac above).
European Patent Office Search Report (Citing references ad, ae, af, ag, above, aj, and ba, bb, bc and bd, below E. Mayer, Mechanical Seals, Chapter 9, pp. 171-173 (1974).

Primary Examiner—Willis Little
Attorney, Agent, or Firm—Wood, Herron & Evans

[57] ABSTRACT

The invention concerns a feeding device installed in a loading bin of a sausage filling machine, consisting of a feed screw 2 which is affixed to a mounting ring 1 that is attached to a roller bearing including a gear rim 10. The mounting ring 1 is provided with at least two upper gaskets and two lower gaskets whose function is to prevent any eventual migration of lubricant from the mechanism housing 26 from contaminating the meat product area 7, while at the same time preventing any contaminating effect of the sausage meat in the opposite direction. The spaces that develop between each pair of gaskets create cleansing areas 13 which assure that such contamination cannot occur. The cleansing areas 13 may also contain a lubricant for the above mentioned gaskets.

17 Claims, 1 Drawing Sheet

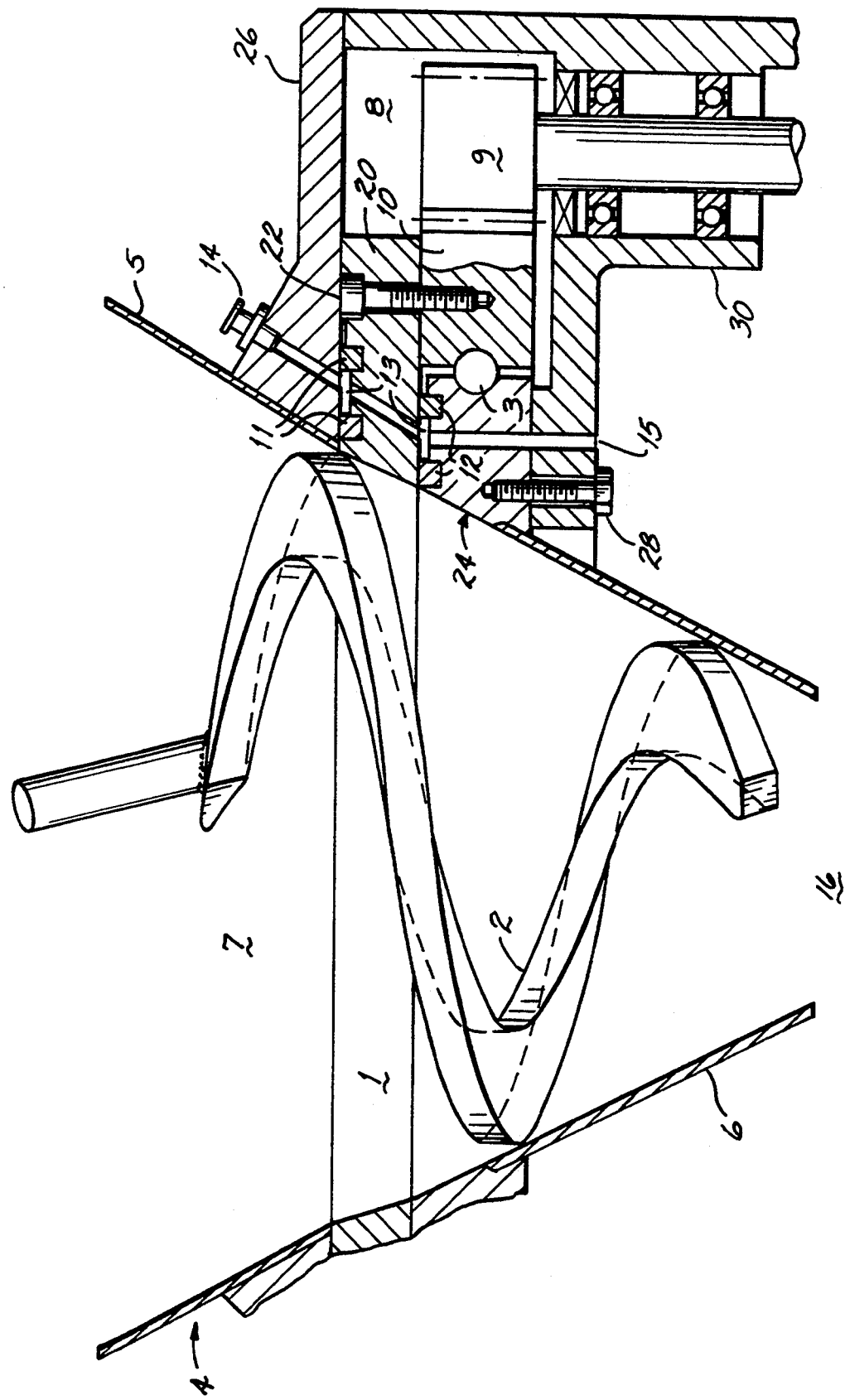

FEEDING DEVICE INSTALLED IN A LOADING BIN, FOR SPECIAL USE IN A SAUSAGE FILLING MACHINE

BACKGROUND OF THE INVENTION

I. Field of the Invention

The invention concerns a feeding device installed in the loading bin of a sausage filling machine, and more particularly, to a mechanism for driving a feed screw in the feeding device.

II. Description of Prior Art

The first element of a sausage filling machine consists of a loading bin or hopper that is shaped as a funnel and located at the top of the machine. The sausage meat is loaded in bulk form into this hopper. From there it is pressed into a conveyor which may consist of a pair of screw pumps. At the far end of these screw pumps the sausage meat is then pressed into a filling tube. The other end of the screw pump system is connected to a vacuum exhaust provided with a variable setting allowing the air to be extracted in various amounts from 0% to 99%. This system is usually called a "vacuum filling sausage machine". The vacuum exhaust sucks the air out of the sausage meat, increasing the compactness of the filling, giving a better color to the final product, providing for a longer shelf life of the sausage and assuring a more precise measuring of the fill.

The above-described system results in a continuous filling process; there is no need to establish interruptions in the procedure and the material may be loaded into the bin at intervals.

As the sausage meet emerges from the filling tube, it is pressed into a casing. The selected weight of each sausage link is determined by a controlling device. After a specific weight has been reached, the sausage link is closed off by means of a twisting device which gives a number of turns to a specific length.

The sausage meat may also be dispensed into glass jars or cans instead of a casing. In this case the twisting device is removed from the machine.

Since the sausage meat consists of a relatively tough and viscous material, it is necessary to install a conveying device into the loading bin in order to press the material on its way toward the outlet of the conical end of the hopper. This device consists usually of a helical conveyor or "feed screw" which is affixed to a driven mounting ring or turntable. The mechanism requires a balanced mounting and the corresponding bearings must be designed so as to assure a clean and hygienic process, especially in cases where food items are being handled. Two main designs of feeding devices have been considered:

a) The feed screw is affixed to a geared mounting ring or turntable mounted on bearings. The turntable is driven radially and the axial forces are absorbed by friction rings which also act as sealing gaskets at the upper and lower ends of a conical loading bin. The upper portion of the bin located above the turntable is built so that it may swivel away, allowing for the removal of the turntable with its attached feed screw and sealing rings. This method provides for the easy cleansing of all components of the mechanism. However, it also has the drawback that a play-free execution is difficult to achieve. The existence of mechanical play at the gear teeth generates annoying noises during the operation of the machine, especially at start up, and also increases the wear and tear of the mechanical elements, resulting in downtime for needed repairs and maintenance. Further problems are caused by the eventual invasion of sausage meet into the drive mechanism. Another unfavorable factor consists of the large weight of the turntable and its associated elements.

b) In an alternative design, the feed screw is affixed to a mounting ring or turntable that is mounted on roller bearings with minimum mechanical play. However, this mode of construction does not allow for the removal of the feed screw during the manual cleansing process. Therefore, the feed screw must be cleaned in site, within the loading bin. It thus becomes necessary to assure a good seal of the hopper from the housing that encloses the mechanical drive elements with their corresponding lubricant. This is achieved by using special gaskets that are located at the upper and lower surfaces of the mounting ring. The mechanical design of this alternative provides good stability for the components, a rather play free interaction of the mechanism elements and an almost noiseless operation. The only disadvantage is that an eventual leakage may occur at the sealing gaskets. Thus, the sausage meat may become contaminated with the lubricant of the drive mechanism, or traces of the sausage meat may be introduced into the housing of the drive where it will eventually deteriorate.

SUMMARY OF THE INVENTION

The objective of the invention is to provide a design for a feeding device installed in the loading bin of a sausage filling machine while reducing to a minimum the chance of contaminating the sausage meat product with the lubricant of the drive mechanism.

According to the invention, at least two concentrically or radially arranged gaskets are placed at each of the upper and lower horizontally disposed surfaces of the mounting ring. The horizontal or radial spacing of the concentric gasket pairs provides gaps on the top and bottom surfaces of the mounting ring to interrupt and catch flow of lubricant and sausage meat between the hopper and the drive mechanism. Thus, the probability of the sausage meat coming in contact with elements of the drive mechanism is substantially reduced. The design also achieves a very stable mechanical structure, as well as reduced levels of noise and very little maintenance. The manual cleansing procedures are simplified without having to remove the mechanical parts.

In the proposed execution of the invention, the upper pair of sealing gaskets are inserted directly into the surface of the mounting ring, while the lower pair of sealing gaskets are inserted into a bracket that is attached to the lower portion of the loading bin.

The upper and lower gaskets may be friction rings to allow for relatively free rotation of the mounting ring when it is actuated by a drive that consists of a pinion and gear mechanism which is supported by roller bearings and attached to the mounting ring.

In the present illustration, two upper gaskets and two lower gaskets have been provided. The circular spaces between the concentric gaskets serve as contamination barriers and are filled with edible fat which is injected through a lubricating nipple. The edible fat lubricates the gaskets and also acts as a barrier between the lubricant of the drive mechanism and the sausage meat. The circular spaces are connected to an outlet through which the edible fat may be purged.

BRIEF DESCRIPTION OF THE DRAWING

The details of the invention are depicted in the attached illustration which represents a schematic cross-section of the lower portion of the loading bin and the conveying device.

DETAILED DESCRIPTION OF THE DRAWING

As seen in the illustration, a mounting ring 1 has affixed thereto a helical conveyor or feed screw 2. Screw 2 is placed inside of loading bin or hopper 4 with ring 1 located between the upper portion 5 and the lower portion 6 of the loading bin 4 which is shaped as a funnel. The outer rim 20 of ring 1 is secured to a drive mechanism as will be described.

The sausage meat is initially loaded into the product intake area 7 of the bin and then forced toward the lower portion of the bin by the action of the feed screw. After emerging from the outlet 16, it is carried away by the action of screw conveyors (not shown) as is conventional.

To rotate feed screw 2 and force sausage meat through hopper 4, mounting ring 1 is driven by a mechanism including a drive pinion 9 which meshes with gear rim 10 attached, such as by screws 22 (only one shown), to the outer rim 20 of mounting ring 1. Gear rim 10 forms part of a roller bearing 3, the stationary part (or bracket) 24 of which is be affixed to the lower portion 6 of hopper 4 and to the drive mechanism housing enclosure 26 such as with screws 28 (only one shown). This construction allows for easy disassembly in case repairs or maintenance are needed. As is evident from the illustration, rotation of pinion 9 (such as by an electric or hydraulic motor by way of example) translates to rotation of gear rim 10 which, in turn, causes rim 1 and screw 2 to rotate.

Drive pinion 9, gear wheel 10 and roller bearing 3 may be lubricated with mineral oil or with edible fat. The upper surface of rim portion 20 of mounting ring 1 contains a first pair of concentrically arranged gaskets 11, which may be designed as friction rings or lip seals. The stationary or lower portion of roller bearing 3 contains a second pair of concentrically arranged gaskets 12 on which the lower surface of outer rim 20 may ride. All these gaskets seal off the sliding surfaces of the mounting ring from the inside 8 of housing 26 as well as from the product intake area 7.

Any migration of the mechanism lubricant from the housing 26 along the upper surface of the mounting ring will be blocked off by the gaskets 11. Likewise, any eventual migration of the mechanism lubricant from gear rim 10 and through roller bearing 3, along the lower surface of the mounting ring 1, will be blocked off by the gaskets 12.

If any residual traces of lubricant are able to migrate through the radially outer ones of the gaskets 11 or 12, such traces will emerge into the circular spaces 13 between the gaskets of each such pair. These spaces 13 communicate to the outside through an outlet orifice 15 and they may be cleansed with a suitable cleaning fluid. However, it is recommended that the spaces 13 be filled with edible fat, which may be supplied through a nipple 14. In that case, the edible fat will act as a barrier for the lubricant that migrates from the housing of the mechanism. At the same time, it serves to lubricate the gaskets. This double effect reduces the need for periodic maintenance and cleaning. The edible fat supply may be renewed by pressing an additional amount through the nipple 14, while the excess of used fat is ejected through the outlet 15.

A channel communicates the spaces 13 and then runs through bracket 30 of housing 26 attached to the lower portion 6 of the loading bin, finally emerging to the outside at point 15.

Depending on the size of the mounting ring, a number of lubricating nipples 14 and outlets 15 may be arranged along its periphery. The upper and lower gaskets serve as barriers against an eventual migration of the sausage meat as well as for the lubricant of the mechanism housing into the spaces 13, which are filled with edible fat. Likewise, the spaces 13 act as barriers against the eventual contamination of the mechanical parts with sausage meat and they also prevent the migration of the lubricant into the meat product areas.

Since the edible fat from the spaces 13 may be purged as needed, a clean separation between the sausage meat and the mechanism housing is assured.

Having described the invention, what is claimed is:

1. A feeding device for a loading bin of a sausage filling machine or the like, the feeding device including a mounting ring having upper and lower surfaces and a drive mechanism rotatably driving the mounting ring, a screw secured to the mounting ring and located in the loading bin, and two concentrically arranged gaskets associated with each of the mounting ring upper and lower surfaces, respectively, wherein a gap is formed between each of the two gaskets along the associated surface of the mounting ring.

2. The feeding device of claim 1 wherein the two gaskets associated with the mounting ring's upper surface are carried by that upper surface.

3. The feeding device of claim 2 further including a bracket being positioned below the mounting ring lower surface and being attached to the loading bin, and wherein the two gaskets associated with the mounting ring lower surface are carried by the bracket whereby the mounting ring rides thereon.

4. The feeding device of claim 1 further including a bracket beginning positioned below the mounting ring lower surface and being attached to the loading bin, and wherein the two gaskets associated with the mounting ring lower surface are carried by the bracket whereby the mounting ring rides thereon.

5. The feeding device of claim 1 wherein the gaskets comprise friction rings.

6. The feeding device of claim 9 wherein the gaskets comprise lip seals.

7. The feeding device of claim 1 further including an inlet communicating with at least one of the gaps formed between the gaskets associated with one of the mounting ring surfaces.

8. The feeding device of claim 7 further including an outlet communicating with said at least one gap.

9. The feeding device of claim 1 further including an inlet communicating with the gaps formed between the gaskets.

10. The feeding device of claim 9 further including an outlet communicating with said gaps.

11. The feeding device of claim 1 further including edible fat in at least one of the gaps formed between the gaskets associated with one of the mounting ring surfaces.

12. The feeding device of claim 11 further including means for inserting and removing the edible fat.

13. The feeding device of claim 1 further including edible fat in the gaps formed between the gaskets.

14. The feeding device of claims 13 further including means for inserting and removing the edible fat.

15. The feeding device of claim 1 wherein the drive mechanism includes a drive pinion and a roller bearing, the roller bearing having a gear rim portion rotatably coupled to the drive pinion and affixed to the mounting ring.

16. The feeding device of claim 15 wherein the roller bearing further has a stationary portion affixed to the loading bin.

17. The feeding device of claim 16 wherein the stationary portion of the roller bearing is positioned below the mounting ring lower surface and wherein the two gaskets associated with the mounting ring lower surface are carried by the stationary portion whereby the mounting ring rides thereon.

* * * * *

UNITED STATES PATENT AND TRADEMARK OFFICE
CERTIFICATE OF CORRECTION

PATENT NO.   :   5,352,150
DATED        :   October 4, 1994
INVENTOR(S)  :   Klaus Markwardt It is certified that error appears in the above-identified patent and that said Letters Patent is hereby corrected as shown below:

Column 4, line 50, "claim 9" should read --claim 1--.

Signed and Sealed this

Thirty-first Day of January, 1995

Attest:

BRUCE LEHMAN

*Attesting Officer*　　*Commissioner of Patents and Trademarks*